United States Patent [19]

Takeuchi et al.

[11] Patent Number: 5,101,449
[45] Date of Patent: Mar. 31, 1992

[54] OPTICAL PHASE MODULATOR WITH ASYMMETRIC PIEZOELECTRIC VIBRATOR

[75] Inventors: Yoshinori Takeuchi, Tokyo; Hidehiko Negishi, Kawasaki; Yuko Takei, Tokyo; Ken Idota, Kawasaki, all of Japan

[73] Assignee: Matsushita Electric Industrial Co., Ltd., Osaka, Japan

[21] Appl. No.: 709,879

[22] Filed: Jun. 4, 1991

[30] Foreign Application Priority Data

Jun. 5, 1990 [JP] Japan .................. 2-148276
Jun. 5, 1990 [JP] Japan .................. 2-148294
Oct. 11, 1990 [JP] Japan .................. 2-273936

[51] Int. Cl.⁵ .................. G02B 6/02; H01J 5/16
[52] U.S. Cl. .......................... 385/3; 385/12; 385/32; 250/227.11; 250/227.21
[58] Field of Search ........... 350/96.11, 96.12, 96.13, 350/96.14, 96.15, 96.29, 96.30; 250/227.11, 227.14, 227.19, 227.16, 227.21; 356/345, 350

[56] References Cited

U.S. PATENT DOCUMENTS

| | | | |
|---|---|---|---|
| 4,255,018 | 3/1981 | Ulrich et al. | 350/96.29 X |
| 4,442,350 | 4/1984 | Rashleigh | 250/227.19 X |
| 4,450,406 | 5/1984 | Bobb | 250/227.19 X |
| 4,477,723 | 10/1984 | Carome et al. | 250/227.19 X |
| 4,613,752 | 9/1986 | Davis | 250/227.19 X |
| 4,671,113 | 6/1987 | Carome | 250/227.19 X |
| 4,735,484 | 4/1988 | Fesler | 350/96.29 |
| 4,799,752 | 1/1989 | Carome | 350/96.15 |
| 5,012,088 | 4/1991 | Cole et al. | 250/227.19 X |
| 5,029,978 | 7/1991 | Curtis et al. | 350/96.29 |
| 5,039,221 | 8/1991 | Layton et al. | 250/227.19 X |

FOREIGN PATENT DOCUMENTS

| | | | |
|---|---|---|---|
| 62-46209 | 2/1987 | Japan | 356/350 X |
| 62-148921 | 7/1987 | Japan | 356/350 X |
| 63-138208 | 6/1988 | Japan | 356/350 X |

OTHER PUBLICATIONS

"Elimination of Drift in a Single-Mode Optical Fiber Interferometer Using A Piezoelectrically Stretched Coiled Fiber" by D. A. Jackson et al; Applied Optics/-vol. 19, No. 17/1 Sep. 1980; pp. 2926-2929.
"Method of Phase-Modulating Signals in Optical Fibers: Application to Optical-Telemetry Systems" by D. E. N. Davies et al; Electronics Letters 24th Jan. 1974 vol. 10, No. 2; pp. 21 and 22.

Primary Examiner—Brian Healy
Attorney, Agent, or Firm—Pollock, Vande Sande & Priddy

[57] ABSTRACT

An optical phase modulator for use with a fiber optic sensor such as a fiber optic gyroscope includes a piezoelectric vibrator which is asymmetric in at least one cross-sectional shape thereof, a pair of electrodes for applying a voltage to said piezoelectric vibrator, and an optical fiber joined to at least a portion of said piezoelectric vibrator by adhesive bonding. The piezoelectric vibrator has a cavity defined therein, and one of said electrodes is disposed on a surface of said piezoelectric vibrator which defines said axial cavity, the other electrode being disposed on an outer surface of said piezoelectric vibrator. The piezoelectric vibrator may be cylindrical, elliptically cylindrical, or planar in shape. The cavity may be cylindrical or elliptically cylindrical in shape.

18 Claims, 6 Drawing Sheets

OPTICAL PHASE MODULATOR WITH ASYMMETRIC PIEZOELECTRIC VIBRATOR

BACKGROUND OF THE INVENTION

1. Field of the Invention

The present invention relates to an optical phase modulator of the optical fiber type, for use with a fiber optic sensor such as a fiber optic gyroscope for measuring changes in various physical quantities including angular displacement, velocity, and acceleration.

2. Description of the Prior Art

Heretofore, optical phase modulators are generally classified into waveguide-type optical phase modulators and optical-fiber-type optical phase modulators. The waveguide-type optical phase modulators comprise an optical waveguide and electrodes which are mounted on a dielectric substrate of lithium niobate. The optical-fiber-type optical phase modulators comprise a cylindrical piezoelectric vibrator and an optical fiber wound therearound. The optical-fiber-type optical phase modulators can easily be optically coupled with a fiber optic sensor such as a fiber optic gyroscope by an optical fiber, a feature which is not possible with the waveguide-type optical phase modulators. The optical-fiber-type optical phase modulators are also advantageous in that they are simple in structure and can easily be manufactured.

FIG. 1 of the accompanying drawings shows a conventional optical phase modulator of the optical fiber type, generally designated by the reference numeral 100. The optical phase modulator 100 includes a cylindrical piezoelectric vibrator 101 which is vibratable in the diametric direction. The optical phase modulator 100 also has an optical fiber 102 wound tightly in several turns around the cylindrical piezoelectric vibrator 101. A light beam to be modulated in phase is transmitted into the optical fiber 102 from one end thereof, and a phase-modulated light beam leaves from the other end of the optical fiber 102. Disc-shaped electrodes 103, 104 are mounted respectively on the axial ends of the cylindrical piezoelectric vibrator 101. When a modulating signal voltage is applied between the electrodes 103, 104, the piezoelectric vibrator 101 is diametrically vibrated, inducing longitudinal stresses and strains in the optical fiber 102 wound around the piezoelectric vibrator 101. The effective refractive index and length of the optical fiber 102 slightly change due to the induced stresses and strains thereof. Therefore, the time needed for the light beam to pass through the optical phase modulator varies depending on the applied modulating signal voltage, impressing phase modulation on the light beam.

The optical-fiber-type optical phase modulators are however disadvantageous in that the phase shift amplitude vs. modulating frequency characteristic curve is irregular because of several different resonant frequencies in a vibration mode depending on the configuration of the optical-fiber-type optical phase modulators. For example, FIG. 2 of the accompanying drawings shows the relationship between the frequencies of a modulating signal, whose voltage is constant, applied to the piezoelectric vibrator 101 and the amplitudes of phase shifts of a light beam that passes through the optical phase modulator 100. The phase shift amplitude vs. modulating frequency characteristic curve shown in FIG. 4 is characterized by irregularities or resonant peaks in a vibration mode of the piezoelectric vibrator 101. The irregular characteristic curve makes it impossible to modulate the phase of a light beam with a modulating signal having a desired waveform for highly accurate measurements with sophisticated signal processing.

SUMMARY OF THE INVENTION

It is an object of the present invention to provide an optical phase modulator which has a smooth phase shift amplitude vs. modulating frequency characteristic curve, can easily be coupled to a fiber optic sensor, and can be manufactured with ease.

According to the present invention, an optical phase modulator comprising a piezoelectric vibrator which is asymmetric in at least one cross-sectional shape thereof, a pair of electrodes for applying a voltage to the piezoelectric vibrator, the electrodes being attached to the piezoelectric vibrator, and an optical fiber joined to at least a portion of the piezoelectric vibrator.

The piezoelectric vibrator has a cavity defined therein, one of the electrodes being disposed on a surface of the piezoelectric vibrator which defines the axial cavity, the other electrode being disposed on an outer surface of the piezoelectric vibrator.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
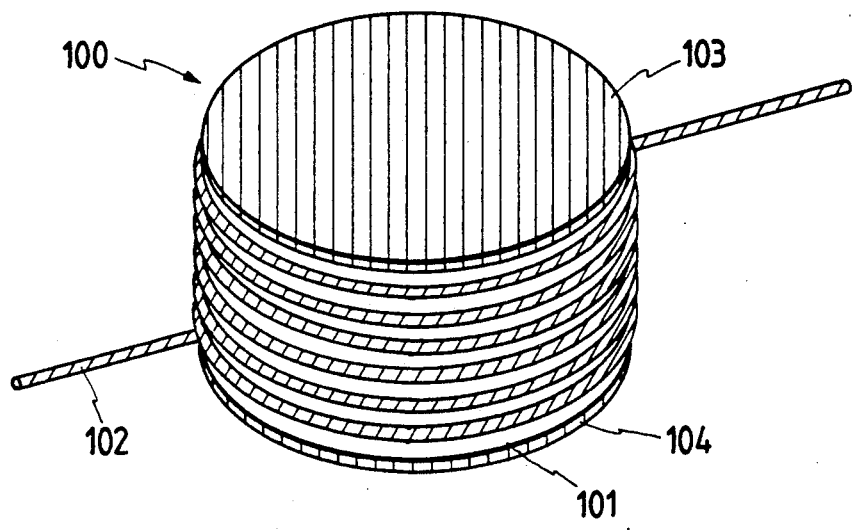
FIG. 1 is a perspective view of a conventional optical-fiber-type optical phase modulator.
Figure 2:
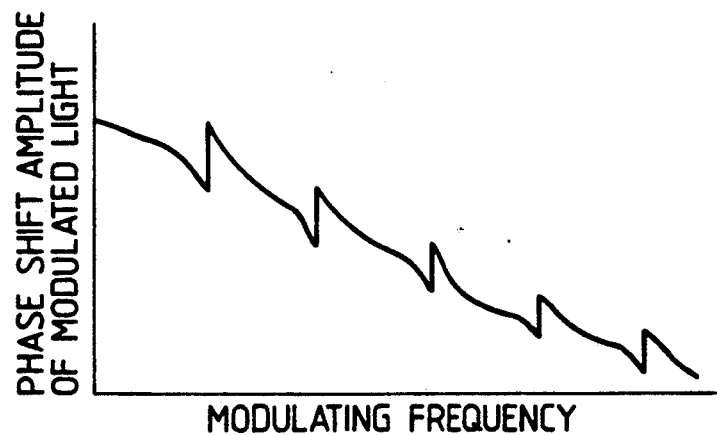
FIG. 2 is a diagram showing the relationship between the frequencies of a modulating signal applied to a piezoelectric vibrator of the conventional optical phase modulator shown in FIG. 1 and the amplitudes of phase shifts of a light beam that passes through the conventional optical phase modulator.
Figure 3:
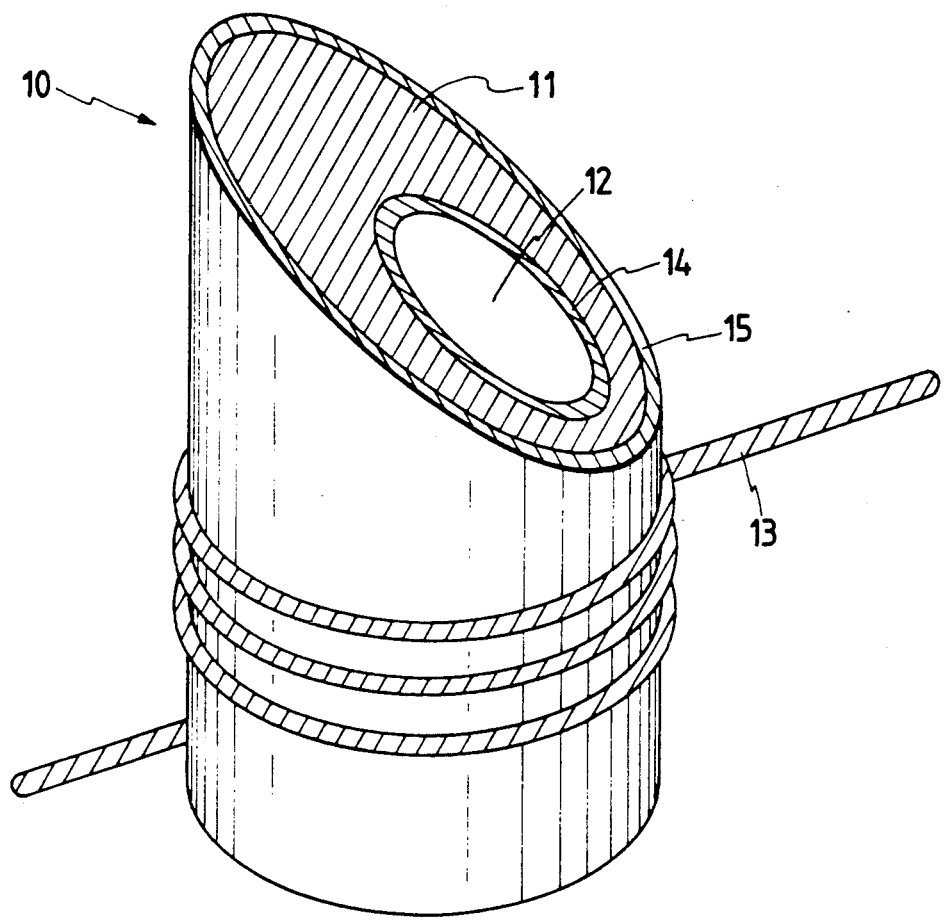
FIG. 3 is a perspective view of an optical-fiber-type optical phase modulator according to an embodiment of the present invention.
Figure 4:
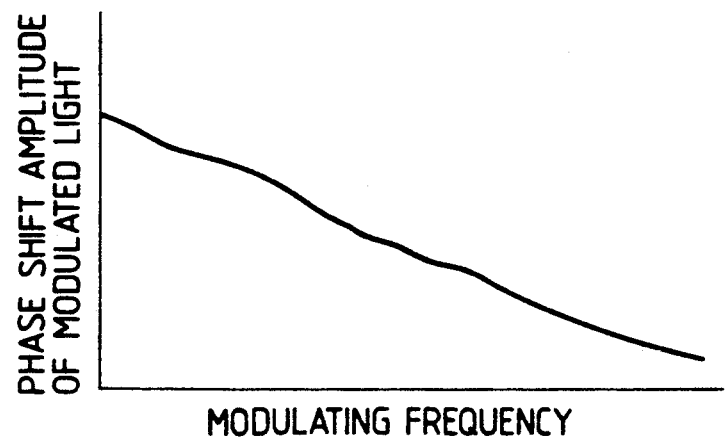
FIG. 4 is a diagram showing the relationship between the frequencies of a modulating signal applied to a piezoelectric vibrator of the optical phase modulator shown in FIG. 3 and the amplitudes of phase shifts of a light beam that passes through the optical phase modulator.

FIGS. 3 and 4 illustrate an optical-fiber-type optical phase modulator according to an embodiment of the present invention.

As shown in FIG. 3, the optical-fiber-type optical phase modulator, generally designated by the reference numeral 10, comprises a cylindrical piezoelectric vibrator 11 of a lead titanate series ceramic material, having one slanted end surface which lies obliquely, i.e., does not lie perpendicularly, to the central axis of the cylindrical piezoelectric vibrator 11. The cylindrical piezoelectric vibrator 11 has a cylindrical cavity 12 defined axially therein and having a central axis which is displaced off the central axis of the cylindrical piezoelectric vibrator 11. Stated otherwise, the cylindrical cavity 12 is positioned eccentrically with respect to the cylindrical piezoelectric vibrator 11. Typically, the cylindrical piezoelectric vibrator 11 has an outside diameter of 30 mm, and the cylindrical cavity 12 has a diameter of 10 mm and its central axis is displaced off the central axis of the cylindrical piezoelectric vibrator 11 by a length of 7 mm.

The optical-fiber-type optical phase modulator 10 also comprises an optical fiber 13 wound in three turns around the cylindrical piezoelectric vibrator 11. An inner tubular electrode 14 is disposed in the cylindrical cavity 12 and held against the inner surface of the cylindrical piezoelectric vibrator 11 which defines the cylindrical cavity 12. An outer tubular electrode 15 is disposed around the outer circumferential surface of the cylindrical piezoelectric vibrator 11. The optical fiber 13 is actually wound around the outer tubular electrode 15.

When a modulating voltage whose amplitude is constant but whose frequency varies is applied between the inner and outer electrodes 14, 15, the cylindrical piezoelectric vibrator 11 vibrates in the diametric direction thereof, i.e., in a direction across the axis thereof. The optical fiber 13 is subjected to stresses depending on the vibration of the piezoelectric vibrator 11, resulting in a change in the effective refractive index of the optical fiber 13. Consequently, the phase of a light beam passing through the optical fiber 13 is modulated.

Since the cylindrical cavity 12 is eccentric with respect to the cylindrical piezoelectric vibrator 11, the wall thickness of the cylindrical piezoelectric vibrator 11 is not uniform, but changes in the circumferential direction. The axial length of the cylindrical piezoelectric vibrator 11 is not uniform either because of the slanted end surface thereof. It is known that resonant peaks in a vibration mode of a cylindrical piezoelectric vibrator are related to the wall thickness and length thereof. Therefore, since the cylindrical piezoelectric vibrator 11 is asymmetrical in some cross-sectional shapes thereof, i.e., has no point of symmetry, no axis of symmetry, and no plane of symmetry in certain cross-sectional shapes thereof, the cylindrical piezoelectric vibrator 11 is not conducive to the generation of resonant peaks in a vibration mode thereof. The optical-fiber-type optical phase modulator 10 with the cylindrical piezoelectric vibrator 11 thus shaped has a phase displacement amplitude vs. modulating frequency characteristic curve which is relatively smooth and has no large resonant peaks, as shown in FIG. 4. The characteristic curve shown in FIG. 4 represents the relationship between the frequencies of a modulating signal, whose voltage is constant, applied to between the electrodes 14, 15 and the amplitudes of phase shifts of a light beam that passes through the optical fiber 13.

Inasmuch as the cylindrical piezoelectric vibrator 11 is cylindrical in shape, it is relatively easy to manufacture and allows the optical fiber 13 to be wound with ease. The eccentric cylindrical cavity 12 is easy to define in the cylindrical piezoelectric vibrator 11 because no accurate axial alignment would be needed. The optical fiber 13 can easily be optically coupled to a fiber optic sensor such as a fiber optic gyroscope.

The serrodyne is known as an effective system for highly accurately processing signals for a fiber optic sensor such as a fiber optic gyroscope or the like. The serrodyne requires the phase of a light beam to be modulated with a sawtooth signal, and should use an optical phase modulator having a wide frequency range, which is capable of phase modulation with a sawtooth signal that has a period ranging from 10 μsec. to 1 msec. An experiment was conducted in which the phase of a light beam was modulated with such a sawtooth signal using the optical phase modulator according to the present invention. In the experiment, it was possible to produce a modulated signal which is practically free of any problems.

FIGS. 5 through 9 show optical-fiber-type optical phase modulators according to other embodiments of the present invention. For the sake of brevity, optical fibers are omitted from illustration in FIGS. 5 through 9.

Figure 5:
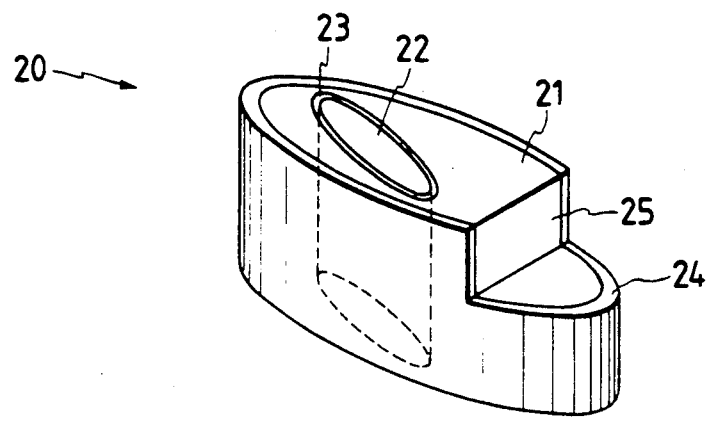
FIGS. 5 through 11 are perspective views of optical-fiber-type optical phase modulators according to other embodiments of the present invention.

In FIG. 5, the optical-fiber-type optical phase modulator, generally designated by the reference numeral 20, includes an elliptically cylindrical piezoelectric vibrator 21 having an eccentric elliptically cylindrical cavity 22 defined axially therein, and inner and outer elliptically cylindrical electrodes 23, 24 held respectively against the inner surface of the piezoelectric vibrator 21 which defines the cavity 22 and the outer circumferential surface of the piezoelectric vibrator 21. The piezoelectric vibrator 21 has a recess 25 defined in a corner thereof remote from the cavity 22, thus making the piezoelectric vibrator 21 asymmetric with respect to the axial direction. An optical fiber (not shown) is wound in a predetermined number of turns around the piezoelectric vibrator 21.

Figure 6:
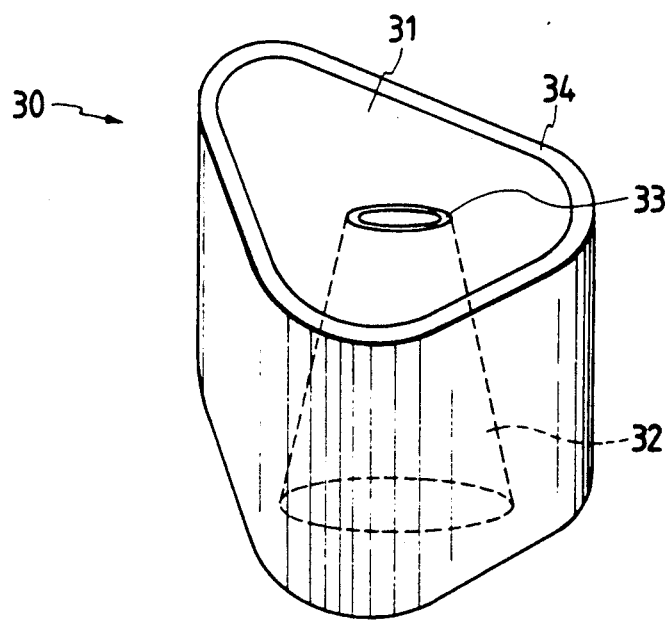

An optical-fiber-type optical phase modulator 30 shown in FIG. 6 comprises a triangularly prismatic piezoelectric vibrator 31 having a frustoconically cylindrical cavity 32 defined axially therein, and inner and outer tubular electrodes 33, 34 held respectively against the inner surface of the piezoelectric vibrator 31 which defines the cavity 32 and the outer circumferential surface of the piezoelectric vibrator 31. An optical fiber (not shown) is wound in a predetermined number of turns around the piezoelectric vibrator 31.

Figure 7:
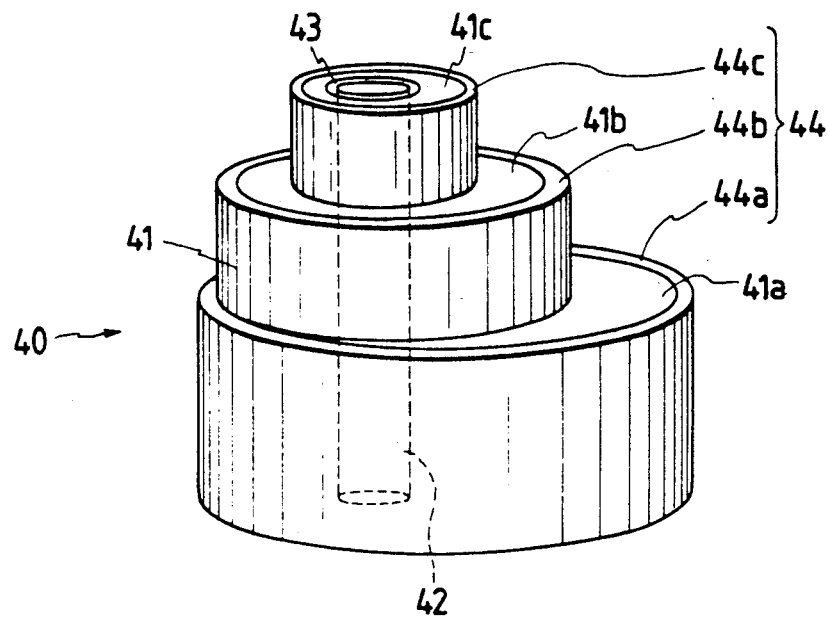

According to an embodiment shown in FIG. 7, an optical-fiber-type optical phase modulator 40 comprises an axially stepped cylindrical piezoelectric vibrator 41 in the form of three cylindrical sections 41a, 41b, 41c having different diameters and axially superimposed in eccentric relationship. The piezoelectric vibrator 41 has a cylindrical cavity 42 defined axially therein through the three cylindrical sections 41a, 41b, 41c. An inner cylindrical electrode 43 is held against the surface of the piezoelectric vibrator 41 which defines the cylindrical cavity 42. An axially stepped outer cylindrical electrode 44 is composed of three cylindrical sections 44a, 44b, 44c which are held against the outer circumferential surfaces of the respective cylindrical sections 41a, 41b, 41c of the stepped cylindrical piezoelectric vibrator 41. An optical fiber (not shown) is wound in a predetermined number of turns around each of the cylindrical sections 41a, 41b, 41c of the piezoelectric vibrator 41. The phase of a light beam traveling through the wound optical fiber is modulated successively by the turns thereof around the cylindrical sections 41a, 41b, 41c. The sizes of the cylindrical sections 41a, 41b, 41c are selected such that resonant peaks thereof cancel out each other for better phase modulation characteristics.

Figure 8:
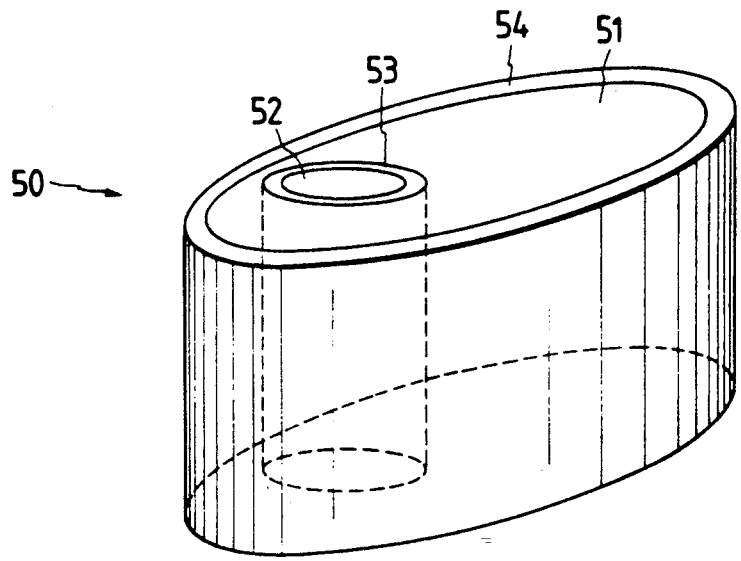

FIG. 8 shows still another optical-fiber-type optical phase modulator 50 which comprises an elliptically cylindrical piezoelectric vibrator 51 having an eccentric cylindrical cavity 52 defined axially therein, and inner and outer electrodes 53, 54 held respectively against the inner surface of the piezoelectric vibrator 51 which defines the cavity 52 and the outer circumferential surface of the piezoelectric vibrator 51. An optical fiber (not shown) is wound in a predetermined number of turns around the piezoelectric vibrator 51.

Figure 9:
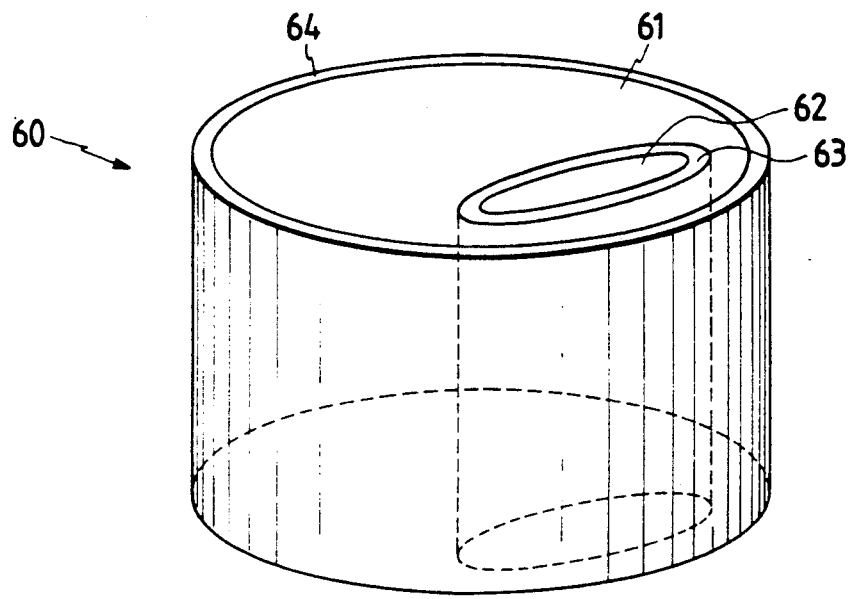

FIG. 9 shows yet still another optical-fiber-type optical phase modulator 60 which comprises a cylindrical piezoelectric vibrator 61 having an eccentric elliptically cylindrical cavity 62 defined axially therein, and inner and outer electrodes 63, 64 held respectively against the inner surface of the piezoelectric vibrator 61 which defines the cavity 62 and the outer circumferential surface of the piezoelectric vibrator 61. An optical fiber (not shown) is wound in a predetermined number of turns around the piezoelectric vibrator 61.

In each of the embodiments shown in FIGS. 5 through 9, the wall thickness of the piezoelectric vibrator is not uniform in any direction across the axis thereof.

Figure 10:
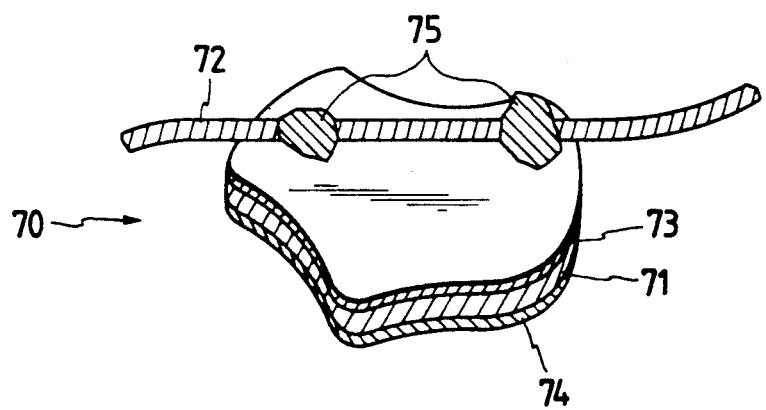

FIG. 10 illustrates a optical-fiber-type optical phase modulator, generally designated by the reference numeral 70, according to a further embodiment of the present invention. The optical-fiber-type optical phase modulator 70 comprises a piezoelectric vibratory plate 71 made of a lead titanate ceramic material and having an asymmetrical shape, i.e., having no point of symmetry, no axis of symmetry, and no plane of symmetry. The piezoelectric vibratory plate 71 has a thickness of about 1 mm, the thickness being not strictly uniform but rather irregular to some extent. The optical phase modulator 70 also has a pair of planar electrodes 73, 74 attached to the respective surfaces of the piezoelectric vibratory plate 71. An optical fiber 72 is bonded to one of the electrodes 73 by masses 75 of adhesive.

When a voltage whose amplitude is constant but whose frequency varies is applied between the electrodes 73, 74, the piezoelectric vibratory plate 71 vibrates in directions to alternately increase and reduce the surface area of the piezoelectric vibratory plate 71. At this time, the optical fiber 12 bonded to the piezoelectric vibratory plate 71 is subject to stresses depending on the increase and reduction in the surface area thereof. The effective refractive index of the optical fiber 12 now varies, resulting in a change in the phase of a light beam traveling through the optical fiber 72.

Since the piezoelectric vibratory plate 71 is asymmetrical in shape, it does not bring about resonant peaks when the surface area is alternately increased and reduced upon vibration thereof. The resonant frequency of the piezoelectric vibratory plate 71 when it vibrates transversely across its width is about 1 MHz, which poses no substantial problem on the optical phase modulator for use with an ordinary fiber optic gyroscope. Even if the optical phase modulator suffers any problem arising from the transverse vibration, its effect on the optical phase modulator is negligible as the thickness thereof is irregular. Accordingly, the amplitude of phase shifts of a light beam passing through the optical fiber 72 does not have appreciable resonant peaks depending on the frequency of a modulating voltage applied between the electrodes 73, 74. As a consequence, the optical phase modulator 70 has a smooth phase shift amplitude vs. modulating frequency characteristic curve.

Figure 11:
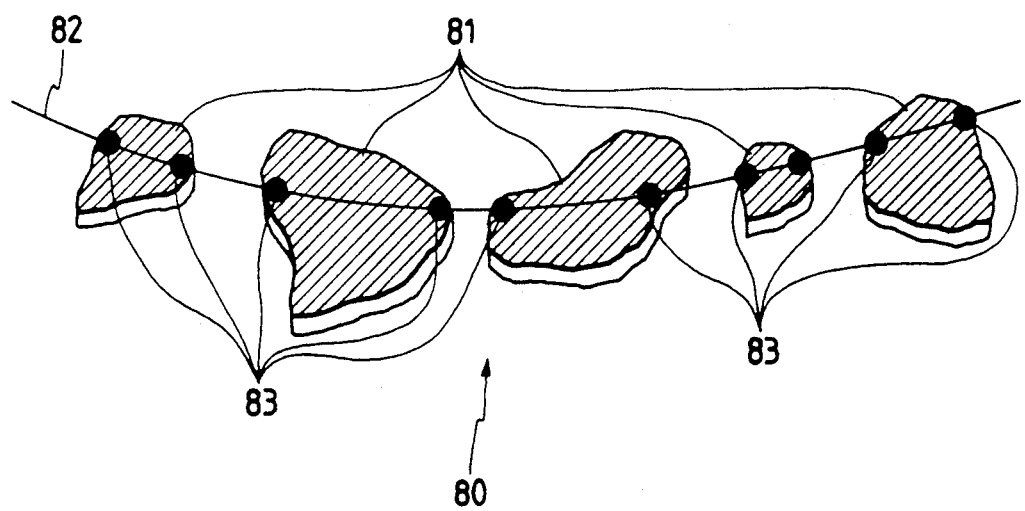

FIG. 11 shows an optical-fiber-type optical phase modulator 80 according to a still further embodiment of the present invention. The optical-fiber-type optical phase modulator 80 comprises a plurality of separate piezoelectric vibratory plates 81 each of asymmetric shape and having planar electrodes (not shown) attached to the opposite surfaces thereof, and an optical fiber 82 bonded to the piezoelectric vibratory plates 81 by masses 83 of adhesive. The piezoelectric vibratory plates 81 have different shapes and thicknesses. Use of the plural piezoelectric vibratory plates 81 results in an increased modulation efficiency. While a single large-size piezoelectric vibratory plate with a long optical fiber bonded thereto would achieve a high modulating efficiency, the large-size piezoelectric vibratory plate would make it impossible to place the optical phase modulator in a small area. The separate piezoelectric vibratory plates 81 make the entire optical phase modulator 80 flexible, and allows it to be installed in a small space. In addition, with the different shapes and thicknesses of the piezoelectric vibratory plates 81, any resonant peaks thereof are canceled out for a smoother phase shift amplitude vs. modulating frequency characteristic curve.

In the embodiments shown in FIGS. 10 and 11, the piezoelectric vibratory plates are easy to manufacture, and the optical fibers can easily be joined to the piezoelectric vibratory plates.

Although certain preferred embodiments of the present invention have been shown and described in detail, it should be understood that various changes and modifications may be made therein without departing from the scope of the appended claims.

What is claimed is:

1. An optical phase modulator comprising:
   a piezoelectric vibrator which is asymmetric in at least one cross-sectional shape thereof;
   a pair of electrodes for applying a voltage to said piezoelectric vibrator, said electrodes being attached to said piezoelectric vibrator; and
   an optical fiber joined to at least a portion of said piezoelectric vibrator.

2. An optical phase modulator according to claim 1, wherein said piezoelectric vibrator has a cavity defined therein, one of said electrodes being disposed on a surface of said piezoelectric vibrator which defines said axial cavity, the other electrode being disposed on an outer surface of said piezoelectric vibrator.

3. An optical phase modulator according to claim 2, wherein said optical fiber is wound around said other electrode.

4. An optical phase modulator according to claim 2, wherein said piezoelectric vibrator is cylindrical in shape, said cavity being defined axially therein.

5. An optical phase modulator according to claim 4, wherein said cavity is cylindrical in shape.

6. An optical phase modulator according to claim 4, wherein said cavity is elliptically cylindrical in shape.

7. An optical phase modulator according to claim 5, wherein said piezoelectric vibrator has a slanted end lying obliquely to the axis thereof.

8. An optical phase modulator according to claim 2, wherein said piezoelectric vibrator is elliptically cylindrical in shape, said cavity being defined axially therein.

9. An optical phase modulator according to claim 8, wherein said cavity is cylindrical in shape.

10. An optical phase modulator according to claim 8, wherein said cavity is elliptically cylindrical in shape.

11. An optical phase modulator according to claim 10, wherein said piezoelectric vibrator has a recess defined in a corner thereof remotely from said cavity.

12. An optical phase modulator according to claim 2, wherein said piezoelectric vibrator is triangularly prismatic in shape, said cavity being defined axially therein.

13. An optical phase modulator according to claim 12, wherein said cavity is frustoconically cylindrical in shape.

14. An optical phase modulator according to claim 5, wherein said piezoelectric vibrator has a plurality of cylindrical sections having different diameters and axially superimposed in eccentric relationship, said other electrode having a plurality of cylindrical sections held respectively against outer circumferential surfaces of said cylindrical sections of said piezoelectric vibrator.

15. An optical phase modulator according to claim 1, wherein said piezoelectric vibrator comprises a piezoelectric vibratory plate, said electrodes being disposed on respective opposite surfaces of said piezoelectric vibratory plate.

16. An optical phase modulator according to claim 15, wherein said optical fiber is bonded to one of said electrodes by adhesive.

17. An optical phase modulator according to claim 1, wherein said piezoelectric vibrator comprises a plurality of piezoelectric vibratory plates, said electrodes being disposed on respective opposite surfaces of each of said piezoelectric vibratory plates.

18. An optical phase modulator according to claim 17, wherein said optical fiber is bonded to one of said electrodes on each of said piezoelectric vibratory plates by adhesive.

* * * * *